United States Patent [19]
Hasselbacher et al.

[11] 3,820,829
[45] June 28, 1974

[54] COUPLING HAVING A SOLID LOCKING RING

[75] Inventors: Roland E. Hasselbacher, Brimfield; Warren F. Budds, Pekin, both of Ill.

[73] Assignee: Caterpillar Tractor Co., Peoria, Ill.

[22] Filed: Aug. 29, 1972

[21] Appl. No.: 284,487

[52] U.S. Cl............... 285/226, 285/300, 285/421
[51] Int. Cl............................................. F16l 51/02
[58] Field of Search .......... 285/226, 227, 228, 229, 285/299, 300, 301, 255, 334.4, 339, 421; 92/34

[56] References Cited
UNITED STATES PATENTS

| | | | |
|---|---|---|---|
| 1,165,449 | 12/1915 | Rietz | 285/226 |
| 2,473,618 | 6/1949 | Stillwagon, Jr. | 285/226 |
| 3,459,444 | 8/1969 | Rope | 285/226 |
| 3,600,009 | 8/1971 | Shupper | 285/226 |

*Primary Examiner*—Mervin Stein
*Assistant Examiner*—Alex Grosz
*Attorney, Agent, or Firm*—Phillips, Moore, Weissenberger, Lempio & Strabala

[57] ABSTRACT

A flexible coupling for interconnecting tubular members having outwardly tapered ends includes a cylindrical member or bellows having an end portion in generally mating relation with the tapered end of each tubular member, a respective solid locking ring having a tapered inner surface being arranged to encircle each end of the bellows and being urged axially into locking engagement with the tapered tubular member.

11 Claims, 4 Drawing Figures

COUPLING HAVING A SOLID LOCKING RING

BACKGROUND OF THE INVENTION

The present invention relates to a coupling and more particularly to such a coupling wherein an overlapping cylindrical member is secured in place upon the tapered end of the tubular member by a solid locking ring.

The coupling of the present invention is particularly adapted for use in engine exhaust manifold assemblies which are subject to high temperature during operation causing severe expansion and contraction of its component parts. Under such conditions, one-piece manifolds often fail due to distortion and thermal fatigue.

Accordingly, it is common practice to use exhaust manifold sections with each section being bolted to one or two engine exhaust ports. These sections may then be coupled together by sliding members or bellows, for example, to compensate for expansion and contraction within the manifold assembly. Sliding couplings are generally undesirable since they may have a tendency to allow exhaust leakage. Seals cannot be readily adapted for use with such couplings because of the high temperatures commonly encountered.

Bellows have also been used as a flexible coupling in such applications. However, it has been common practice to weld the bellows in place or employ special clamps which may tend to be relatively expensive or otherwise undesirable.

SUMMARY OF THE INVENTION

Accordingly, it is an object of the present invention to provide a coupling for securing a cylindrical member to a tubular member having a tapered end. To secure the cylindrical member in place on the tubular member, a solid locking ring encircles the cylindrical member and is sized for locking engagement with the tapered tubular member. A portion of the inner cylindrical surface of the ring is tapered to form an inwardly directed annular apex for engagement with the cylindrical member.

A coupling of the type summarized above is preferably adapted for use in an engine exhaust manifold assembly with the cylindrical assembly being a bellows, each end of the bellows being secured to a tapered tubular member by a similar locking ring.

A particular feature of the present invention is the tapered configuration for the inner cylindrical surface of the locking ring providing an inwardly directed annular apex. While the ring is being axially urged into engagement with the tapered surface, it tends to invert because of engagement between its annular apex and the tapered surface. After the ring is positioned on the tapered surface, it tends to return to an uninverted configuration, thus further tightening its grip upon the cylindrical member or bellows and providing a more secure coupling.

Other objects and advantages of the invention are made apparent in the following description having reference to the accompanying drawings.

DESCRIPTION OF A PREFERRED EMBODIMENT

Figure 1:
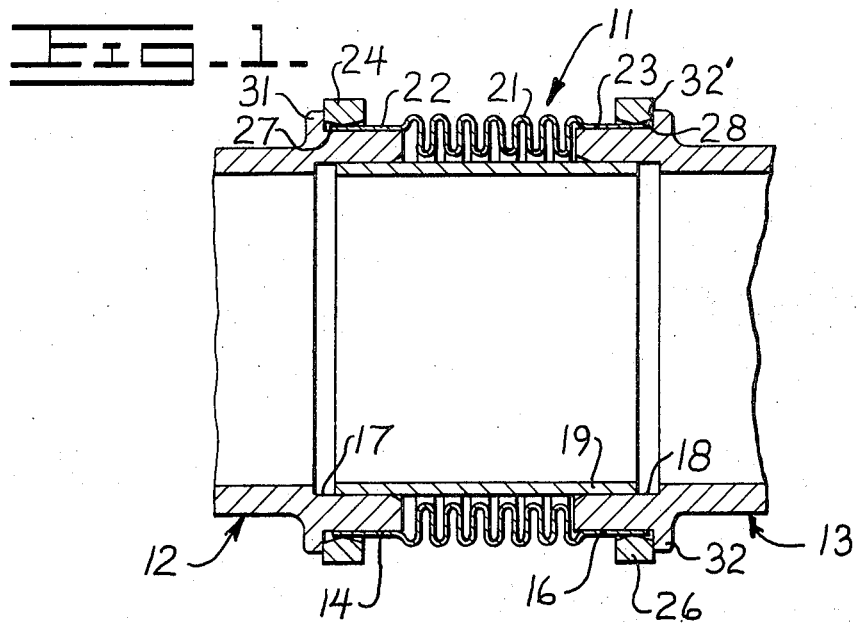
FIG. 1 is an axially sectioned view of a coupling, according to the present invention, arranged between two tubular members.
Figure 2:
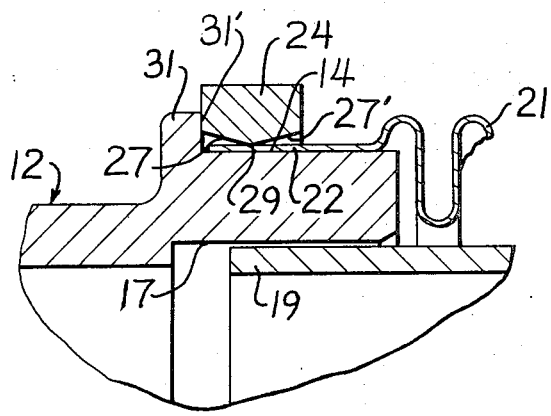
FIG. 2 is an enlarged, fragmentary view of one end of the coupling.

FIG. 1 represents a portion of an engine exhaust manifold assembly wherein a coupling 11 constructed according to the present invention is arranged between two tubular members 12 and 13 having tapered end portions 14 and 16 respectively. The tubular members 12 and 13 of the exhaust manifold assembly have internal counterbores 17 and 18 in which a liner 19 is arranged. An interconnecting cylindrical member or bellows 21 has cylindrical end portions 22 and 23 which generally mate respectively with the tapered ends 14 and 16 of the tubular members 12 and 13. The cylindrical end portions 22 and 23 are held in place upon the tapered surfaces 14 and 16 in substantially sealed relation by respective locking rings indicated at 24 and 26. Referring particularly to FIG. 2, each of the locking rings encircles one of the cylindrical ends of the bellows 21 while being axially urged into locking engagement on the tapered surfaces 14 and 16.

The arrangement of tapered surfaces, particularly on the tubular members 12 and 13 as well as on the locking rings 24 and 26 is of particular importance to the present invention. Referring again to FIGS. 1 and 2, it may be seen that the surfaces 14 and 16 are tapered inwardly and axially toward each other. Each of the locking rings 24 and 26 has at least one tapered surface, 27 and 28 respectively, which tapers radially outwardly and toward the respective tubular members 12 and 13. Further, the inclination of the tapers 27 and 28 on the locking rings 24 and 26 are substantially greater than the inclination of the adjacent tapered surfaces 14 and 16 on the tubular members 12 and 13.

The tapered surface on each locking ring, for example that indicated at 27 on the locking ring 24, forms an annular apex 29 which is inwardly directed for engagement with the respective cylindrical end portion 22 of the bellows. Preferably, each of the locking rings has a double taper forming the annular apex. For example, referring to FIG. 2, the annular apex 29 is formed by the tapered surface 27 and another tapered surface 27'.

In the preferred embodiment, the tapered surfaces 27 and 27' on the locking ring have an inclination of approximately 15° while inclination of the tapered surfaces 14 and 16 is approximately 3°. These values, of course, are subject to substantial variation within the scope of the present invention.

Figure 3:
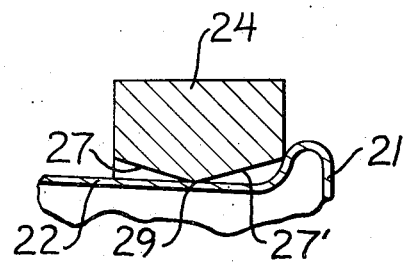
FIG. 3 is a further enlarged, fragmentary view, in section, of a portion of a bellows and one locking ring prior to its installation upon the tapered tubular member.

Various features of the present invention may be better understood by a brief description of the manner in which the coupling may be installed. Referring particularly to FIG. 3, one of the locking rings, for example that indicated at 24 is installed in encircling relation about the cylindrical end 22 of the bellows. The cylindrical end of the bellows is then flanged outwardly to retain the locking rings in place prior to installation of the coupling. This also places the cylindrical end portion 22 in a generally mating configuration with the tapered surface 14.

After the cylindrical end portions 22 and 23 of the bellows are installed as shown in FIG. 1, the locking rings are urged toward the positions illustrated in FIG. 1 to secure the cylindrical ends of the bellows upon the tapered surfaces.

Referring particularly to the locking ring 24, as it is urged leftwardly into the position illustrated in FIGS. 1 and 2, interaction between its inwardly directed apex 29 and the cylindrical end portion 22 tends to invert the ring or rotate its cross section as illustrated in FIG. 2 in a counterclockwise direction. Once the ring is in place and axial force is no longer being applied to it, it tends to return to its uninverted position, causing its apex 29 to more firmly urge the cylindrical end portion 22 against the tapered surface 14. Accordingly, it is necessary to construct the locking rings 24 and 26 out of material exhibiting at least a limited amount of resilience. To withstand the high temperatures in the preferred environment of an engine manifold assembly, the locking rings are preferably formed of a metal such as AMS 6304 steel with a nickel plating of at least 0.00025 inches in thickness. The ends of the bellow or cylindrical member 21 are preferably somewhat ductile. The bellows may be single ply stainless steel tubing, for example, to withstand high temperatures in the preferred environment.

Shoulders 31 and 32 are preferably formed upon the tubular members 12 and 13 respectively. Referring particularly to FIG. 2, the shoulders, 31 and 32, provide stop surfaces 31' and 32' which limit axial travel of the locking rings 24 and 26. Thus, when the locking rings are being installed, for example by use of a hammer or other tool such as a hydraulic or mechanical press, the shoulders on the tubular members serve as a simple indication of when the locking rings are sufficiently stressed to firmly secure the ends of the bellows upon the tapered surfaces 14 and 16.

Figure 4:
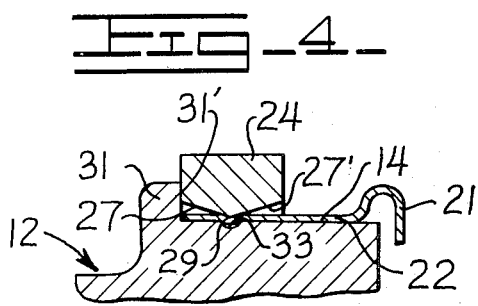
FIG. 4 is an enlarged, fragmentary view, in section, of a portion of a bellows and one locking ring, according to an alternate embodiment of the invention.

An alternate embodiment, as illustrated in FIG. 4, includes an annular groove 33 formed in the tapered surface 14 of the tubular member 12. With this arrangement, as the locking ring 24 is urged axially into contact with the stop surface 31' of the shoulder 31 the apex 29 is radially aligned with the groove 33. Accordingly, as the locking ring 24 moves into locking engagement with the tapered end of the tubular member the return of the locking ring to its uninverted position, as previously described, causes the apex to displace the cylindrical end portion 22 into the groove 33. This deformation of the cylindrical end portion provides a more positive mechanical lock between the cylindrical member and the tubular member. This mechanical interlock is of particular importance in instances where the rate of thermal expansion and contraction of the locking ring and tapered member varies due to differences in cross section and/or material.

It will be apparent from the above description that the coupling of the present invention may be adapted for use in other applications besides the embodiments discussed above. Further, it is particularly noted that the present invention may be directed to a coupling including the cylindrical member or bellows 21 and only one of the locking rings, for example, that indicated at 24. Such a coupling might be of use for example when the other end of the bellows or cylindrical member 21 is already secured to a tubular member or other component.

What we claim is:

1. A flexible coupling for interconnecting two tubular members formed of hard material and having generally axially aligned tapered ends, comprising
   a bellows having a cylindrical end portion of ductile material generally mating relation with the tapered end of each tubular member, and
   a solid locking ring of resilient material encircling each end portion of the bellows, each ring being urged axially into locking engagement with the tapered end of the respective tubular member, a portion of the inner cylindrical surface of each ring being tapered to form an inwardly directed annular apex for engaging the end portion of the bellows, each locking ring being sized for a tight fit with the end portion of the bellows arranged upon the tapered end of the tubular member, the resilience and cross-sectional configuration of the locking rings being selected to permit inversion of each locking ring as it is axially urged into locking engagement with the end portion of the bellows and the tapered end of the tubular member, the locking ring thereafter tending to return to its uninverted condition and urge the end portion of the bellows into close engagement with the tapered end of the tubular member.

2. The coupling of claim 1 further comprising a shoulder formed on each tubular member adjacent its tapered end to limit axial travel of the respective locking ring.

3. The coupling of claim 1 wherein the tapered inner cylindrical surface of each locking ring is of substantially greater inclination than the tapered end of the respective tubular member.

4. The coupling of claim 3 wherein the inner cylindrical surface of each locking ring has a double taper forming an annular apex for engagement with the respective cylindrical end portion of the bellows.

5. The coupling of claim 3 wherein the tapered inner cylindrical surface of each locking ring has an inclination of generally 15° and the tapered end of each tubular member has an inclination of generally 3°.

6. The coupling of claim 5 wherein the cylindrical end portions of the bellows also have an inclination of generally 3°.

7. The coupling of claim 1 wherein the tubular members are portions of an engine exhaust manifold assembly, the bellows and locking rings being formed of metal.

8. The coupling of claim 7 wherein the inner cylindrical surface of each locking ring has a double taper forming an annular apex for engagement with the respective cylindrical end portion of the bellows.

9. A coupling for connection to a tubular member of hard material and having a tapered end, comprising
   a cylindrical member of generally ductile material being sized for encircling engagement with the tapered member, and
   a solid resilient locking ring encircling an end of the cylindrical member and sized for locking engagement with the cylindrical member and the tapered tubular member, a portion of the inner cylindrical surface of the ring being tapered to form an inwardly directed annular apex for engagement with the cylindrical member, the locking ring being sized for a tight fit with the cylindrical member arranged upon the tapered end of the tubular member, the resilience and cross-sectional configuration of the locking ring being selected to permit inversion of the locking ring as it is axially urged into locking engagement with the cylindrical member and the tapered end of the tubular member, the locking ring thereafter tending to return to its uninverted condition and urge the cylindrical member into close engagement with the tapered end of the tubular member.

10. The coupling of claim 9 wherein the coupling is subject to high temperatures, the cylindrical member and locking ring being formed from metal.

11. The coupling of claim 9 wherein the tapered end of said tubular member includes means defining an annular groove disposed for radial alignment with said annular apex when said locking ring is disposed in locking engagement with the tapered end of the tubular member.

* * * * *